(12) United States Patent
Shi

(10) Patent No.: US 11,987,374 B2
(45) Date of Patent: May 21, 2024

(54) SYSTEMS AND METHODS FOR DRIVING FAN BLADES OF AN ENGINE

(71) Applicant: THE BOEING COMPANY, Chicago, IL (US)

(72) Inventor: Fong Shi, Clyde Hill, WA (US)

(73) Assignee: The Boeing Company, Chicago, IL (US)

( * ) Notice: Subject to any disclaimer, the term of this patent is extended or adjusted under 35 U.S.C. 154(b) by 12 days.

(21) Appl. No.: 17/471,277

(22) Filed: Sep. 10, 2021

(65) Prior Publication Data

US 2022/0234749 A1 Jul. 28, 2022

Related U.S. Application Data

(60) Provisional application No. 63/142,527, filed on Jan. 28, 2021.

(51) Int. Cl.
*B64D 27/24* (2024.01)
*B64D 31/06* (2024.01)
*F02C 9/16* (2006.01)

(52) U.S. Cl.
CPC ............ *B64D 31/06* (2013.01); *B64D 27/24* (2013.01); *F02C 9/16* (2013.01)

(58) Field of Classification Search
CPC .... F01D 10/15; F02C 7/32; F02C 7/36; F02C 7/268; F02C 7/275
See application file for complete search history.

(56) References Cited

U.S. PATENT DOCUMENTS

| | | | | |
|---|---|---|---|---|
| 6,531,799 B1* | 3/2003 | Miller | ................. | H02K 21/046 310/156.43 |
| 6,762,526 B2* | 7/2004 | Isozaki | ................ | H02K 37/125 310/112 |
| 7,525,228 B2* | 4/2009 | Chuang | ............... | F04D 25/0653 310/112 |
| 8,063,527 B2* | 11/2011 | Qu | .......................... | H02K 16/00 310/112 |
| 10,892,654 B2* | 1/2021 | Huang | .................... | H02K 1/182 |
| 11,121,654 B2* | 9/2021 | Athavale | ............. | H02P 21/0003 |
| 2006/0284507 A1* | 12/2006 | Murakami | ........... | H02K 1/2793 310/156.55 |
| 2016/0308411 A1* | 10/2016 | Watanabe | ................ | H02K 1/14 |
| 2019/0115518 A1* | 4/2019 | Kacprowski | ............. | F01D 25/14 |
| 2019/0323427 A1* | 10/2019 | Mackin | .................. | B64D 27/24 |
| 2020/0067361 A1* | 2/2020 | Shaw | ..................... | H02K 41/03 |

OTHER PUBLICATIONS

D.J. Airways, "2-Spool vs. 3-Spool", https://www.dj-airways.com/2-spool-vs-3-spool.
The Engineering Toolbox, "Torques in Electrical Induction Motors", https://www.engineeringtoolbox.com/electrical-motors-torques-d_651.html.

(Continued)

*Primary Examiner* — Thuyhang N Nguyen
(74) *Attorney, Agent, or Firm* — Joseph M. Butscher; The Small Patent Law Group LLC

(57) ABSTRACT

A system and a method for driving a fan of an engine of an aircraft, including an electric motor operatively coupled to a drive axle of the fan, and a control unit in communication with the electric motor. The control unit is configured to operate the electric motor to rotate the fan.

20 Claims, 5 Drawing Sheets

(56) References Cited

OTHER PUBLICATIONS

"GEnx Engine with FADEC mounted to Fan Case", https://www.researchgate.net/figure/GEnx-Engine-with-FADEC-mounted-to-Fan-Case_fig6_304625913.

Hughes, Austin, "Field oriented control of induction motorshttps", ://www.sciencedirect.com/topics/engineering/field-priented-control, 2019.

* cited by examiner

SYSTEMS AND METHODS FOR DRIVING FAN BLADES OF AN ENGINE

CROSS-REFERENCE TO RELATED APPLICATIONS

This application relates to and claims priority benefits from U.S. Provisional Application No. 63/142,527, entitled "Systems and Methods for Driving Fan Blades of an Engine," filed Jan. 28, 2021, which is hereby incorporated by reference in its entirety.

FIELD OF THE DISCLOSURE

Embodiments of the present disclosure generally relate to systems and methods for driving fan blades of an engine, such as an engine of an aircraft.

BACKGROUND OF THE DISCLOSURE

Various aircraft include propulsion systems, such as two or more engines. For example, certain aircraft include turbofan engines having a plurality of fan blades coupled to an engine core.

Existing turbofan engines use gearboxes, additional shafts, or induction motors to drive the fan blades. However, such known driving systems exhibit performance, size, and/or weight drawbacks. Moreover, drive systems that include engine fan motors typically utilize general purpose motors that are configured for ground-based applications, but not aircraft in flight.

A known engine includes a gearbox that is used to reduce both a speed and noise of fan blades. The gearbox adds size and weight to the engine, such as by having a relatively large fan at a front end. Another known engine includes a three-spool engine having three shafts, thereby also adding size and weight to the engine. With both of these known engines, a time to spool up an engine typically takes multiple minutes.

In order to improve engine performance, independent control of the fan has been proposed. There have been attempts to disengage the fan stage from an engine spool, and drive the fan directly by using an electric motor.

For example, an existing induction motor uses conductor bars placed alongside a rotor. The rotor follows a generated rotating electromagnetic field of a stator. However, induction motors are known to have deficiencies in torque and speed control due to an inherent slip. Further, speed adjustment for induction motors is limited. As load increases, rotor speed drops, and slip increases, thereby resulting in an air volume drop that can be unacceptable for any turbofan engine of high bypass ratio (such as greater than 10:1). Additionally, as demand for a surge torque can push the motor beyond a breakdown torque threshold, the induction motor can be susceptible to stalling.

On the other hand, conventional permanent magnet motors or brushless direct current (DC) motors, use permanent magnets instead of conductor bars. When stator windings are energized in a rotating manner, the rotor follows the electromagnetic field generated by the stator windings, without slippage. A special driver is typically required for speed and torque control of such motors.

For both induction and brushless DC motors, the stators encircle the rotors. Flux generated by each stator winding completes its own loops through the motor housing, resulting in a pattern of multi-dimensional flux flow. As such, core loss, eddy current loss, and the like are high. Both induction and brushless DC motors are bulky and heavy, thereby adding size and weight to an engine. With high torque ripple and poor operation efficiencies, such motors of general purpose are designed for utility and industrial applications on the ground, but are not well suited for turbofan engines of an aircraft.

For use on a jet engine, both speed and torque of an electric motor need to be precisely monitored and controlled. A full authority digital engine control (FADEC) is an electronic system including a digital electronic engine controller (EEC), or engine control unit (ECU), and related supporting accessories that control all aspects of aircraft engine performance. However, known FADECs of jetliners typically are not designed for driving an electric motor, let alone provide optimized speed-torque control of such a motor.

SUMMARY OF THE DISCLOSURE

A need exists for an efficient, compact, and relatively low-weight system and method for driving fan blades of an engine, such as an engine of an aircraft. Further, a need exists for a system and method of driving a motor that drives a fan of an engine.

With those needs in mind, certain embodiments of the present disclosure provide a system for driving a fan of an engine of an aircraft. The system includes an electric motor operatively coupled to a drive axle of the fan, and a control unit in communication with the electric motor. The control unit is configured to operate the electric motor to rotate the fan.

As an example, the control unit is within the engine. As a further example, the control unit is within the electric motor.

In at least one embodiment, the electric motor includes a housing defining an internal chamber, a stator within the internal chamber, and a rotor within the internal chamber. A portion of the drive axle is coupled to the rotor.

In at least one embodiment, the rotor extends around the stator. As an example, the rotor includes at least one channel. At least a portion of the stator is disposed within the at least one channel. As an example, the stator includes at least one core disposed between opposed rims of the rotor.

The housing can be formed of one or both of an aluminum alloy or a composite material.

In at least one example, the rotor includes at least four magnetic poles.

As an example, the electric motor further includes an encoder configured to measure rotor flux angles and speed. As a further example, the control unit includes a full authority digital engine control (FADEC) in communication with a speed and torque responder that determines speed and flux angles of the rotor.

Certain embodiments of the present disclosure provide a method for driving a fan of an engine of an aircraft. The method includes operatively coupling an electric motor to a drive axle of the fan; communicatively coupling a control unit with the electric motor; and operating, by the control unit, the electric motor to rotate the fan.

Certain embodiments of the present disclosure provide an aircraft including an engine having a fan, and a system for driving the fan of the engine, as described herein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a high-torque engine fan motor for a turbofan engine. Compared to existing systems, the motor has reduced size, weight, and energy loss. Further, an enhanced engine control unit is provided that optimizes speed-torque control for the engine fan motor.

Embodiments of the present disclosure allow for precise monitoring and control of speed and torque for an electric motor used to control fan speed in a turbofan engine. In at least one embodiment, the motor is a compact, lightweight electric motor. The motor also has reduced core loss and energy consumption, thereby providing a more efficient system. The motor may also be optimized to permit the speed of fan blade tips to run at higher revolutions per minute, which is beneficial for smaller turbofan engines with smaller-diameter fans.

Certain embodiments of the present disclosure provide an electric motor that is configured to provide high-torque and surge torque to a fan of a turbofan engine. The motor allows for reduced flux path to reduce loss. Path loss is further reduced by the ability to use laminated steel for the rotor core and stator core. Less copper is also used, which reduces core loss and energy consumption. With flux not going through the motor housing, materials can be switched from ferrous materials to aluminum alloy or other lighter materials. Optimized motor performance can be achieved by encoders embedded inside the motor.

Figure 1:
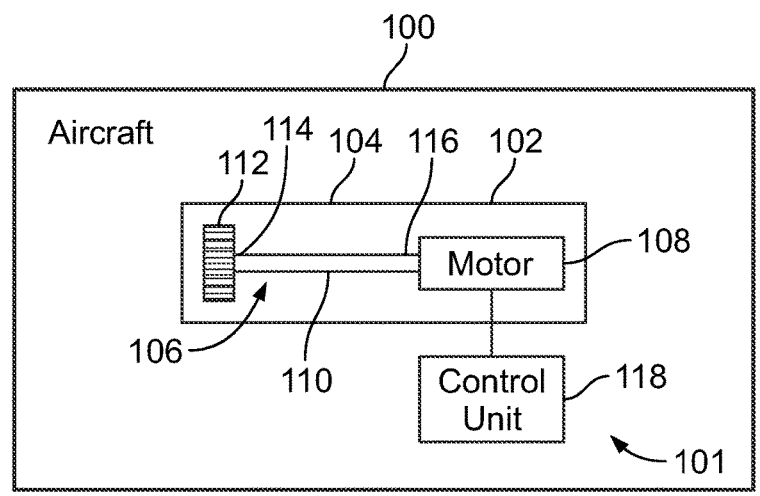
FIG. 1 illustrates a schematic block diagram of an aircraft having an engine, according to an embodiment of the present disclosure.

FIG. 1 illustrates a schematic block diagram of an aircraft 100 having an engine 102 (or a front end of a turbofan engine), according to an embodiment of the present disclosure. In at least one embodiment, the engine 102 is a turbofan engine. The engine 102 includes a housing 104 containing a fan 106 coupled to a motor 108. The fan 106 includes a drive axle 110. A plurality of fan blades 112 extend radially from a first end 114 of the drive axle 110. The drive axle 110 also includes a second end 116 that is opposite from the first end 114. The second end 116 is operatively coupled to the motor 108. The motor 108 operates to rotate the drive axle 110, and therefore the fan blades 112.

In at least one embodiment, the motor 108 is an electric motor. A control unit 118 is in communication with the motor 108, such as through one or more wired or wireless connections. The control unit 118 is configured to operate the motor 108 to drive the fan 106, as described herein.

In at least one embodiment, the control unit 118 is outside of the engine 102. In at least one other embodiment, the control unit 118 is within the engine 102, mounted on the motor 108, or on or within the housing 104.

As described herein, certain embodiments of the present disclosure provide a system 101 for driving the fan 106 of the engine 102 of the aircraft 100. The system 101 includes the motor 108, such as an electric motor, operatively coupled to the drive axle 110 of the fan 106. The control unit 118 is in communication with the electric motor 108. The control unit 118 is configured to operate the electric motor 108 to rotate the fan 106.

As used herein, the term "control unit," "central processing unit," "unit," "CPU," "computer," or the like may include any processor-based or microprocessor-based system including systems using microcontrollers, reduced-instruction set computers (RISC), application-specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 118 may be or include one or more processors that are configured to control operation thereof, as described herein.

The control unit 118 is configured to execute a set of instructions that are stored in one or more data storage units or elements (such as one or more memories), in order to process data. For example, the control unit 118 may include or be coupled to one or more memories. The data storage units may also store data or other information as desired or needed. The data storage units may be in the form of an information source or a physical memory element within a processing machine.

The set of instructions may include various commands that instruct the control unit 118 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 118. It is to be understood that the processing or control units may represent circuits, circuitry, or portions thereof that may be implemented as hardware with associated instructions (e.g., software stored on a tangible and non-transitory computer-readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 118 may represent processing circuitry such as one or more of a field-programmable gate array (FPGA), application-specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
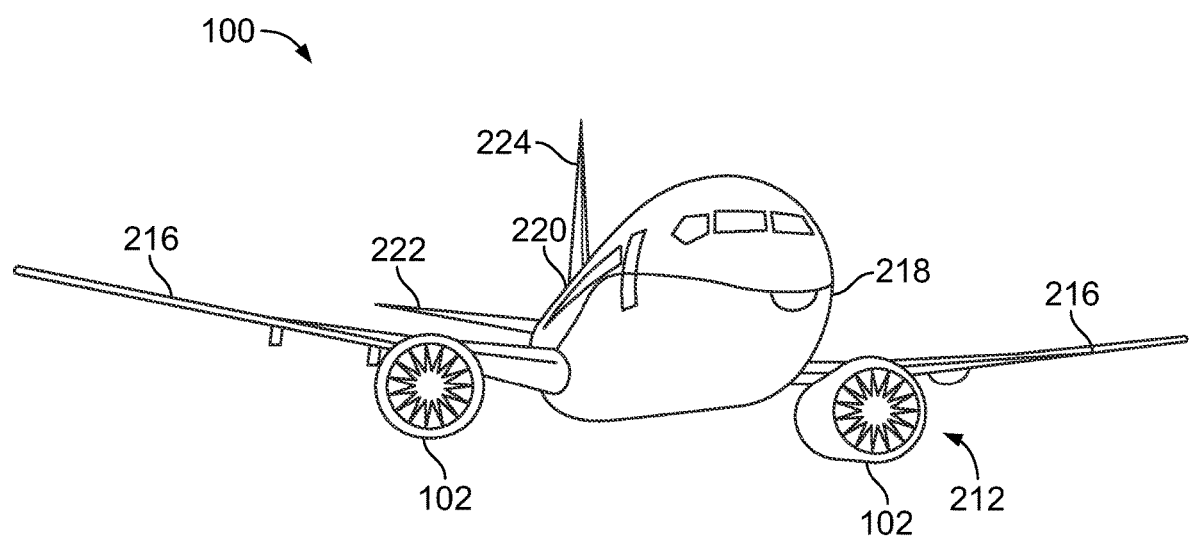
FIG. 2 illustrates a front perspective view of an aircraft, according to an exemplary embodiment of the present disclosure.

FIG. 2 illustrates a front perspective view of the aircraft 100, according to an exemplary embodiment of the present disclosure. The aircraft 100 includes a propulsion system 212 that includes two engines 102, for example. Optionally, the propulsion system 212 may include more engines 102 than shown. The engines 102 are carried by wings 216 of the aircraft 100. In other embodiments, the engines 102 are carried by a fuselage 218 and/or an empennage 220. The empennage 220 may also support horizontal stabilizers 222 and a vertical stabilizer 224. The fuselage 218 of the aircraft 100 defines an internal cabin, including a flight deck.

Figure 3:
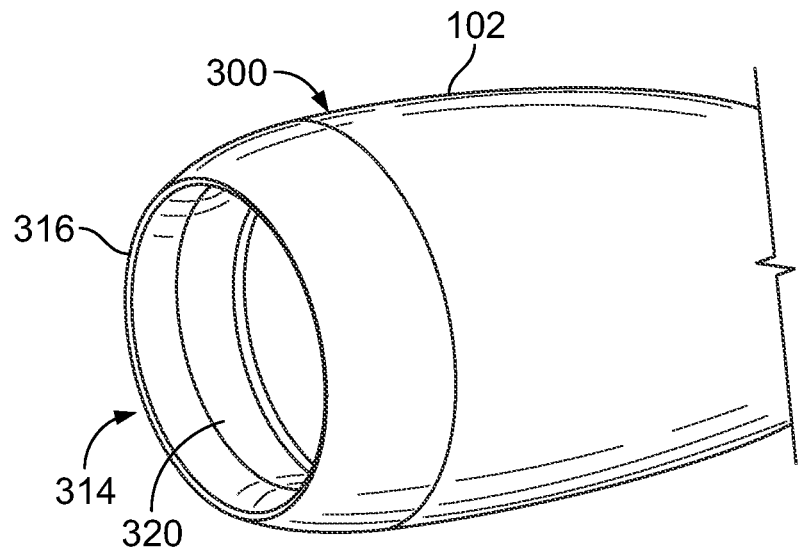
FIG. 3 illustrates a lateral perspective view of an engine, according to an embodiment of the present disclosure.

FIG. 3 illustrates a lateral perspective view of an engine 102, according to an embodiment of the present disclosure. In at least one embodiment, the engine 102 is a turbofan engine having a case 300 that includes an engine inlet 314. The engine inlet 314 may include a leading edge 316 and an inner barrel section 320 located aft of the leading edge 316 of the engine inlet 314. The inner barrel section 320 may provide a boundary surface or wall for directing airflow (not shown) entering the engine inlet 314 and passing through the engine 102. The inner barrel section 320 may be located in relatively close proximity to one or more fan blades (not shown in FIG. 3). In this regard, the inner barrel section 320 may also be configured to serve as an acoustic structure having a plurality of perforations in an inner face sheet of the inner barrel section 320 for absorbing noise generated by the rotating fan blades and/or noise generated by the airflow entering the engine inlet 314 and passing through the engine 102.

Figure 4:
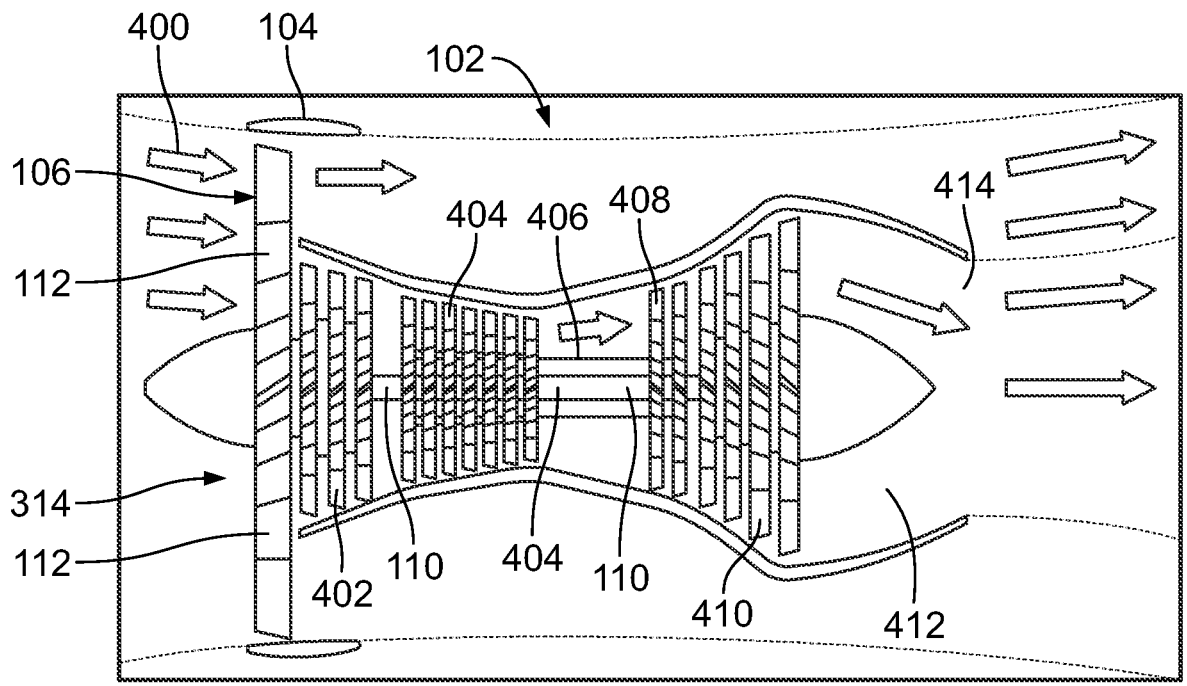
FIG. 4 illustrates a transverse cross-sectional view of the engine.

FIG. 4 illustrates a transverse cross-sectional view of an engine 102, such as a turbofan engine. The fan blades 112 of the fan 106 are located at a fore end of the engine 102 proximate to the engine inlet 314 that receives airflow 400. The engine 102 further includes a low pressure compressor 402 and a high pressure compressor 403. The fan blades 112 may be decoupled (for example, detached) from the low pressure compressor 402. The motor 108 and the control unit 118 may be disposed between the fan blades 112 and the low pressure compressor 402. In at least one embodiment, the drive axle 110 includes a low pressure shaft 404 coaxial with, and inside of, a high pressure shaft 406. Optionally, the drive axle 110 can be or otherwise include a single shaft. A high pressure turbine 408 is behind (for example, downstream from) the high pressure compressor 403. A low pressure turbine 410 is behind (for example, downstream from) the high pressure turbine 408. A nozzle 412 is at or otherwise proximate to an outlet end 414.

The low pressure shaft 404 and the high pressure shaft 406 operate separately on two engine spools, for example. N1 reading on a cockpit display commonly refers to the speed of the spool on which the fan blades 112 (such as the low pressure compressor 402 and the low pressure turbine 410 stages) are attached. N2 on the cockpit display commonly represents the spool of the high pressure compressor 403 in the compressor core and the high pressure turbine 408 in the gas core.

In order to draw in sufficient airflow 400, while at the same time reducing the noise generated by the moving air, the tip speed (that is, the speed of the outermost portions) of the fan blades 112 is controlled, such as via the control unit 118 operating the motor 108 (shown in FIG. 1). If the tip speed was not controlled, the resulting energy could be used to suppress supersonic shockwaves, resulting in poor fuel efficiency of the engine 102.

As noted above, a known engine includes a gearbox to reduce both the speed and the noise of the fan blades. However, the gearbox adds size and weight to the engine. Another known engine includes an additional shaft, thereby providing a three-spool engine. Such known engines typically exhibit engine spool-up times of multiple minutes. The fan speed is determined by the speed of one spool, with or without a gear ratio.

Figure 5:
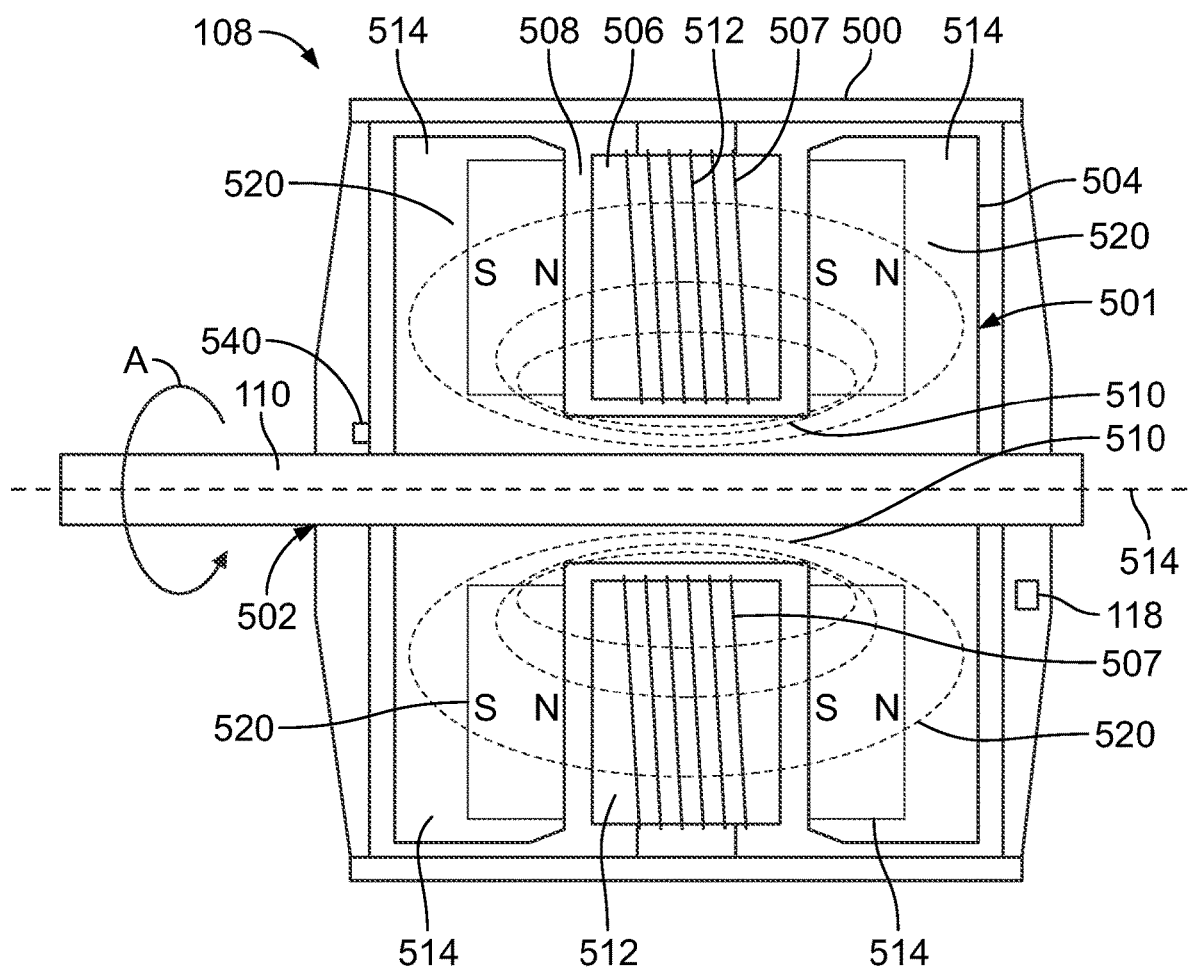
FIG. 5 illustrates a simplified transverse internal view of a motor coupled to a drive axle, according to an embodiment of the present disclosure.

FIG. 5 illustrates a simplified transverse internal view of the motor 108 coupled to the drive axle 110, according to an embodiment of the present disclosure. The motor 108 includes a housing 500 that receives the second end 116 of the drive axle 110. The second end 116 of the drive axle 110 passes through a passage 502 of the housing 500. The motor 108 is configured to rotate the drive axle 110, such as in the direction of arc A.

The housing 500 defines an internal chamber 501 that contains a rotor 504 and a stator 506. That is, the rotor 504 and the stator 506 are within the internal chamber 501. The second end 116 of the drive axle 110 passes through the rotor 504.

In contrast to known motors, the rotor 504 extends around the stator 506 including windings 507. For example, the rotor 504 includes at least one channel 508. In at least one embodiment, an inboard portion 510 of the rotor 504 is disposed between the stator 506 and the drive axle 110. In at least one embodiment, the rotor 504 directly connects to the drive axle 110.

In at least one embodiment, the rotor 504 includes at least portions that are outside of the stator 506. For example, the stator 506 is disposed within the channel(s) 508. The stator 506 includes at least portions that are not outboard (that is, not further away from a central axis 514) from at least portions of the rotor 504.

In at least one embodiment, the rotor 504 encircles the stator 506. The stator 506 can be disposed within the rotor 504, such as within the channel 508.

In at least one embodiment, the stator 506 includes a plurality of cores 512. For example, the stator 506 can include two, three, four, or more cores 512 regularly spaced about a central axis 514 of the motor 108. Each core 512 is sandwiched between opposed rims 520 of the rotor 504 within a channel 508. The rims 520 are connected together through the inboard portion 510, which is inboard (that is, closer to the central axis 514) than the stator 506. As such, the rims 520 and inboard portion 510 of the rotor 504 forms a U shaped structure, in which the cores 512 of the stator 506 are disposed within the channel(s) 508.

Because flux is routed to the path of least reluctance, the flux does not pass through the housing 500. A length of each flux path is therefore much shorter (as compared to motors in which stators encircle a rotor), thereby resulting in less loss in each path. Accordingly, the flux is localized in unidirectional flow. In at least one embodiment, due to unidirectional flow of flux, the rotor 504 and/or the stator 506 can be formed of grain-oriented steel in a laminated form to further reduce the path loss.

Additionally, the windings 507 of the stator 506 include less copper (as compared to known stators), thereby reducing weight and cost. By reducing the core loss and energy consumed by the windings 507, overall efficiency of the motor 108 is improved over conventional motors. Moreover, internal shaft-mounted cooling fans and heat sinks on the housing 500 are no longer needed. Because flux does not pass through the housing 500, the housing can be made with a lightweight material, such as an aluminum alloy, a composite material, or the like, instead of heavy iron or other ferrous materials.

Moreover, by having at least two magnetic poles 520 (in at least one embodiment, at least four magnetic poles 520, as shown in FIG. 5) placed around the rotor 504, extra torque with reduced torque ripple is available within a given space. Motor torque and efficiency are improved, while motor size and weight are reduced. In at least one embodiment, for motor performance optimization, an encoder 540 made of magnets and sensors can be embedded inside the motor 108 to measure the rotor flux angles and speed of the rotor in revolutions per minute (RPM). The motor 108 permits the speed of fan blade tips to run at higher RPM. As such, the motor 108 is well-equipped for use in smaller turbofan engines, such as on wings where ground clearance is limited.

As described herein, the motor 108 is operated by the control unit 118 (shown in FIG. 1). The control unit 118 can be externally mounted on the housing 500. A wide range of speed-torque control, even a surge of torque demand during airplane takeoff and/or emergency go-around at landing, can be accomplished with an enhancement to a FADEC engine controller.

Figure 6:
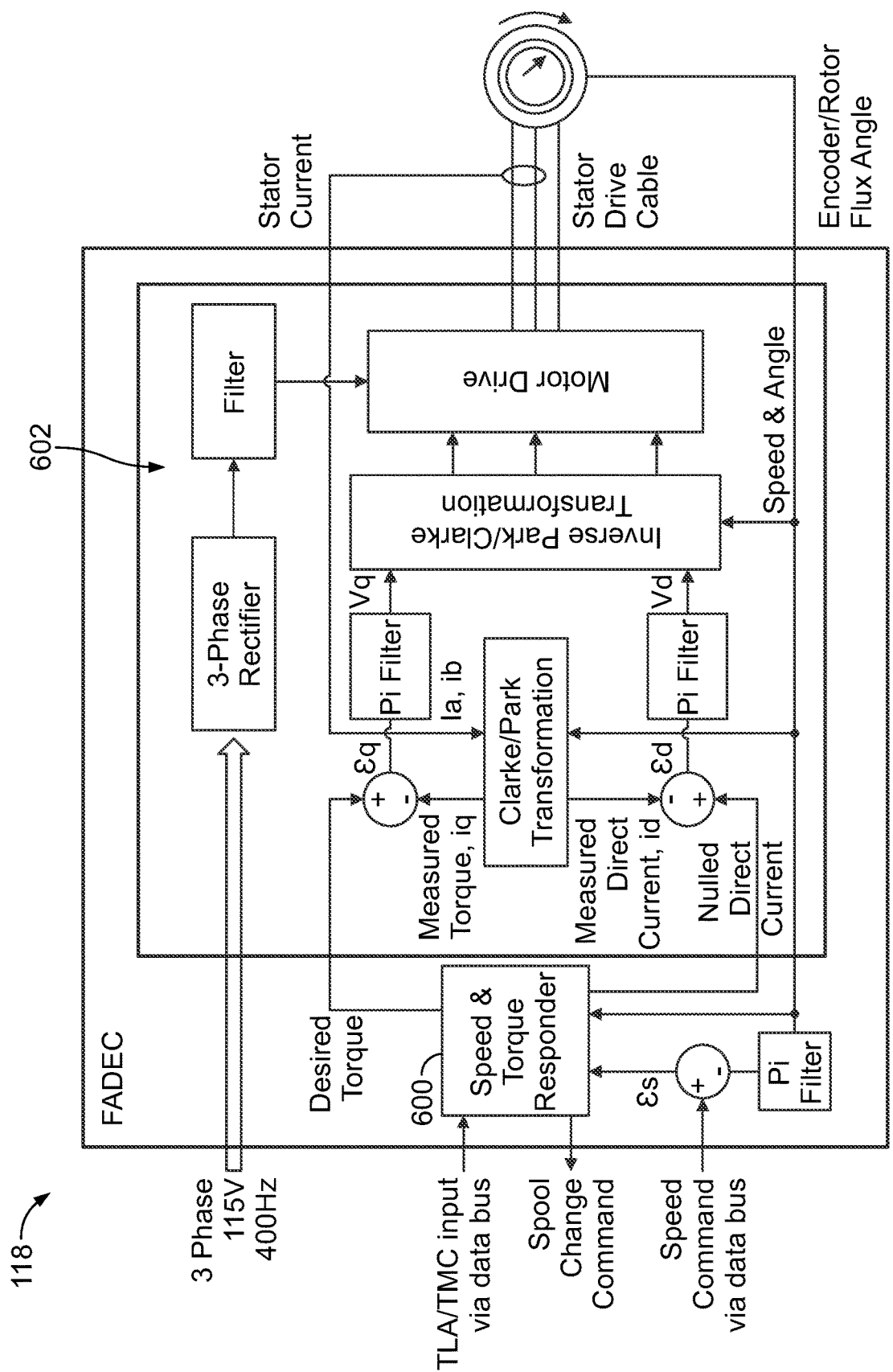
FIG. 6 illustrates a schematic diagram of a control unit, according to an embodiment of the present disclosure.

FIG. 6 illustrates a schematic diagram of the control unit 118, according to an embodiment of the present disclosure. Referring to FIGS. 5 and 6, in at least one embodiment, the control unit 118 provides a FADEC enhancement (for example, an enhanced FADEC) that incorporates a speed and torque responder 600, which is well suited for a compact motor capable of providing high torque. For example, in at least one embodiment, the control unit 118 is or otherwise includes a FADEC in communication with a speed and torque responder 600. In at least one embodiment, the motor 108 includes the embedded encoder 540 that provides RPM signals as well as flux angles of the rotor 504. The speed and torque responder 600 is in communication with the encoder 540. The speed and torque responder 600 determines the speed and the flux angles of the rotor 504, such as through signals received from the encoder 540.

To obtain maximum motor torque at a given motor current, vector orientation of the stator current can be at 90° with respect to the rotor flux. The encoder 540 embedded inside the motor 108 counts the RPM and measures the rotor flux angle. The speed and torque responder 600 of the control unit 118 receives signals from the encoder 540 as well as the commands for change of speed and/or torque. The speed and torque responder 600 provides signals for desired speed and desired torque, as well as direct current which can be nulled.

A vector controller 602 calculates the amplitude and phase values of the motor current each at 90° with respect to the rotor flux, then creates three current vectors or signals. First, a Clarke transformation takes any two out of the three signals of the motor current, adds the two, then negates the sum to obtain the third, thus converting three 120°-phase-apart vectors into two phase vectors $\alpha$ and $\beta$ in 90° coordinates. Next, a Park transformation rotates these new $\alpha$-$\beta$ coordinates where quadrature axis lines up 90° with respect to direct axis, that is, the rotor flux. Sinusoidal moving values of the motor currents are Park transformed into slow varying (substantially DC) values in D-axis and Q-axis, meanwhile AC frequency becomes absent. Q-axis has the torque command of the motor while commanded D-axis value (undesirable D-torque) is minimized or otherwise reduced. The speed and torque responder 600 produces two error signals $\epsilon q$ and $\epsilon d$. Pi filters made from capacitors and inductors produce Vq and Vd. Using inverse Park transformation, stationary reference is transformed back to $\alpha$-$\beta$ rotational reference. Finally, inverse Clarke transformation returns three voltage signals to modulate the power drive stage and energize the windings 507 of the stator 506. The speed of the rotor 504 in RPM is obtained from the encoder 540. The measured RPM signal is filtered and compared with a received speed command. An error signal $\epsilon s$ is produced and processed by the speed and torque responder 600, before desired torque and nulled direct current are computed. In general, the control unit 118 can be or otherwise include a speed-torque vector controller containing two feedback loops: a torque loop inside of a speed loop. The process repeats itself every time the control unit 118 receives a command signal via a data bus for a change of speed and torque for the fan motor.

Referring to FIGS. 1-6, the control unit 118 can be remote from the engine 102. In at least one other embodiment, the control unit 118 can be disposed within the engine 102, such as within the housing 104. As a further example, the motor 108 can include the control unit 118. For example, as shown in FIG. 5, the control unit 118 can be embedded or otherwise housed within the motor 108. As described herein a high torque motor and an enhanced engine controller is provides optimum engine operations under any flight condition.

Figure 7:
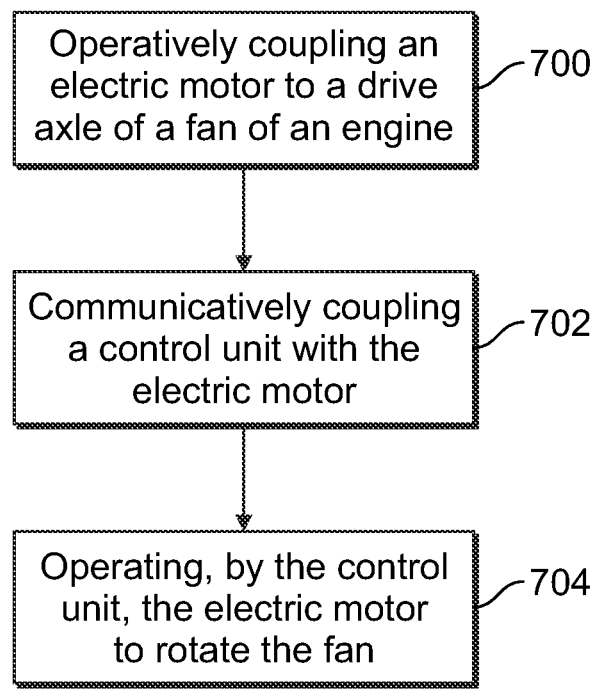
FIG. 7 illustrates a flow chart of a method for driving a fan of an engine of an aircraft, according to an embodiment of the present disclosure.

FIG. 7 illustrates a method for driving a fan of an engine of an aircraft, according to an embodiment of the present disclosure. The method comprises operatively coupling, at 700, an electric motor to a drive axle of the fan; communicatively coupling, at 702, a control unit with the electric motor; and operating at 704, by the control unit, the electric motor to rotate the fan.

In at least one embodiment, the method also includes disposing a stator within an internal chamber of a housing of the electric motor; disposing a rotor within the internal chamber; and coupling a portion of the drive axle to the rotor.

As an example, the method also includes extending the rotor around the stator. Also, as an example, the method includes disposing at least a portion of the stator within at least one channel of the rotor. As a further example, the method includes disposing at least one core of the stator between opposed rims of the rotor.

In at least one embodiment, the method includes providing the rotor with at least four magnetic poles.

In at least one embodiment, the method includes measuring, by an encoder of the electric motor, rotor flux angles and speed.

As an example, the method also includes communicatively coupling a full authority digital engine control (FA- DEC) of the control unit with a speed and torque responder; and determining, by the speed and torque responder, speed and flux angles of the rotor.

As described herein, embodiments of the present disclosure provide efficient, compact, and relatively low-weight systems and methods for driving fan blades of an engine, such as an engine of an aircraft.

Further, the disclosure comprises embodiments according to the following clauses:

Clause 1. A system for driving a fan of an engine of an aircraft, the system comprising:
an electric motor operatively coupled to a drive axle of the fan; and
a control unit in communication with the electric motor, wherein the control unit is configured to operate the electric motor to rotate the fan.

Clause 2. The system of Clause 1, wherein the control unit is within the engine.

Clause 3. The system of Clause 1, wherein the control unit is within the electric motor.

Clause 4. The system of any of Clauses 1-3, wherein the electric motor comprises:
a housing defining an internal chamber;
a stator within the internal chamber; and
a rotor within the internal chamber,
wherein a portion of the drive axle is coupled to the rotor.

Clause 5. The system of Clause 4, wherein the rotor extends around the stator.

Clause 6. The system of Clauses 4 or 5, wherein the rotor comprises at least one channel, and wherein at least a portion of the stator is disposed within the at least one channel.

Clause 7. The system of any of Clauses 4-6, wherein the stator comprises at least one core disposed between opposed rims of the rotor.

Clause 8. The system of any of clauses 4-7, wherein the housing is formed of one or both of an aluminum alloy or a composite material.

Clause 9. The system of any of Clauses 4-8, wherein the rotor comprises at least four magnetic poles.

Clause 10. The system of any of Clauses 4-9, wherein the electric motor further comprises an encoder configured to measure rotor flux angles and speed.

Clause 11. The system of any of clauses 4-10, wherein the control unit comprises a full authority digital engine control (FADEC) in communication with a speed and torque responder that determines speed and flux angles of the rotor.

Clause 12. A method for driving a fan of an engine of an aircraft, the method comprising:
operatively coupling an electric motor to a drive axle of the fan;
communicatively coupling a control unit with the electric motor; and
operating, by the control unit, the electric motor to rotate the fan.

Clause 13. The method of Clause 12, wherein a stator is within an internal chamber of a housing of the electric motor, wherein a rotor is within the internal chamber, and wherein the method further comprises coupling a portion of the drive axle to the rotor.

Clause 14. The method of Clause 13, wherein the rotor extends around the stator.

Clause 15. The method of Clauses 13 or 14, wherein at least a portion of the stator is within at least one channel of the rotor.

Clause 16. The method of any of Clauses 13-15, wherein at least one core of the stator is between opposed rims of the rotor.

Clause 17. The method of any of Clauses 13-16, wherein the rotor comprises at least four magnetic poles.

Clause 18. The method of any of Clauses 13-17, further comprising measuring, by an encoder of the electric motor, rotor flux angles and speed.

Clause 19. The method of any of Clauses 13-18, further comprising:
communicatively coupling a full authority digital engine control (FADEC) of the control unit with a speed and torque responder; and
determining, by the speed and torque responder, speed and flux angles of the rotor.

Clause 20. An aircraft comprising:
an engine having a fan; and
a system for driving the fan of the engine, the system comprising:
an electric motor operatively coupled to a drive axle of the fan, wherein the electric motor comprises a housing defining an internal chamber, a stator within the internal chamber, a rotor within the internal chamber, and an encoder configured to measure rotor flux angles and speed, wherein a portion of the drive axle is coupled to the rotor, wherein the rotor comprises at least one channel, wherein at least a portion of the stator is disposed within the at least one channel; and
a control unit in communication with the electric motor, wherein the control unit is configured to operate the electric motor to rotate the fan, wherein the control unit comprises a full authority digital engine control (FADEC) in communication with a speed and torque responder that determines speed and flux angles of the rotor.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for driving a fan of an engine of an aircraft, the system comprising:
    an electric motor operatively coupled to a drive axle of the fan, wherein the electric motor comprises:
        a housing defining an internal chamber;
        a stator within the internal chamber, wherein the stator comprises windings and one or more cores; and
        a rotor encircling the stator including the windings and the one or more cores within the internal chamber,
        wherein a portion of the drive axle is coupled to the rotor,
        wherein the one or more cores are disposed between opposed rims of the rotor,
        wherein each of the rims comprises an outer wall facing the one or more cores, and one or more magnets facing the one or more cores, and
        wherein the one or more magnets are flush with the outer wall; and
    a control unit including one more processors in communication with the electric motor,
    wherein the control unit is configured to operate the electric motor to rotate the fan.

2. The system of claim 1, wherein the control unit is within the engine.

3. The system of claim 1, wherein the control unit is within the electric motor.

4. The system of claim 1, wherein the rotor comprises at least one channel, and wherein at least a portion of the stator is disposed within the at least one channel.

5. The system of claim 1, wherein the housing is formed of one or both of an aluminum alloy or a composite material.

6. The system of claim 1, wherein the rotor comprises at least four magnetic poles.

7. The system of claim 1, wherein the electric motor further comprises an encoder configured to measure rotor flux angles and speed.

8. The system of claim 1, wherein the control unit comprises a full authority digital engine control (FADEC) in communication with a speed and torque responder that determines speed and flux angles of the rotor.

9. The system of claim 1, wherein the rotor includes at least portions that are outside of the stator.

10. The system of claim 1, wherein no portion of the stator is outboard from the rotor.

11. A method for driving a fan of an engine of an aircraft, the method comprising:
    operatively coupling an electric motor to a drive axle of the fan, wherein a stator is within an internal chamber of a housing of the electric motor, wherein the stator comprises windings and one or more cores, and wherein a rotor encircles the stator including the windings and the one or more cores within the internal chamber, wherein the one or more cores are disposed between opposed rims of the rotor, wherein each of the rims comprises an outer wall facing the one or more cores, and one or more magnets facing the one or more cores, and wherein the one or more magnets are flush with the outer wall;
    coupling a portion of the drive axle to the rotor;
    communicatively coupling a control unit with the electric motor; and
    operating, by the control unit, the electric motor to rotate the fan.

12. The method of claim 11, wherein at least a portion of the stator is within at least one channel of the rotor.

13. The method of claim 11, wherein the rotor includes at least four magnetic poles.

14. The method of claim 11, further comprising measuring, by an encoder of the electric motor, rotor flux angles and speed.

15. The method of claim 11, further comprising:
    communicatively coupling a full authority digital engine control (FADEC) of the control unit with a speed and torque responder; and
    determining, by the speed and torque responder, speed and flux angles of the rotor.

16. The method of claim 11, wherein the rotor includes at least portions that are outside of the stator.

17. The method of claim 11, wherein no portion of the stator is outboard from the rotor.

18. An aircraft comprising:
    an engine having a fan; and
    a system for driving the fan of the engine, the system comprising:
        an electric motor operatively coupled to a drive axle of the fan, wherein the electric motor comprises:
            a housing defining an internal chamber;
            a stator within the internal chamber, wherein the stator comprises windings and one or more cores;
            a rotor encircling the stator including the windings and the one or more cores within the internal chamber, wherein a portion of the drive axle is coupled to the rotor, wherein the rotor comprises at least one channel, and wherein at least a portion of the stator is disposed within the at least one channel, wherein the one or more cores are disposed between opposed rims of the rotor, wherein each of the rims comprises an outer wall facing the one or more cores, and one or more magnets facing the one or more cores, and wherein the one or more magnets are flush with the outer wall; and
            an encoder configured to measure rotor flux angles and speed; and
        a control unit in communication with the electric motor, wherein the control unit is configured to operate the electric motor to rotate the fan, and wherein the control unit comprises a full authority digital engine control (FADEC) in communication with a speed and torque responder that determines speed and flux angles of the rotor.

19. The aircraft of claim 18, wherein the rotor includes at least portions that are outside of the stator.

20. The aircraft of claim 18, wherein no portion of the stator is outboard from the rotor.

\* \* \* \* \*